Jan. 6, 1931.                M. LEBRUN ET AL                1,788,310
                              WELDING ELECTRODE
                              Filed Oct. 21, 1926

INVENTORS:
Maurice Lebrun
and Jean Brillié
By
ATTORNEY

Patented Jan. 6, 1931

1,788,310

UNITED STATES PATENT OFFICE

MAURICE LEBRUN AND JEAN BRILLIÉ, OF PARIS, FRANCE, ASSIGNORS TO LA SOCIÉTÉ: LA SOUDURE AUTOGÈNE FRANCAISE, OF PARIS, FRANCE

WELDING ELECTRODE

Application filed October 21, 1926, Serial No. 143,209, and in France October 30, 1925.

This invention relates to electrodes, welding rods used for welding or cutting by the electric arc, and particularly to those which comprise several metallic electrodes laid side by side but insulated from one another and bound together so as to form a single stick.

We have found that with such an arrangement there are obtained in the welding operation very interesting industrial results when, and only when, the metal part of each electrode is given a section different from the round form generally used in arc welding practice, and we have also found that in the finished single rod or stick the grouping of the elementary electrodes, that is to say the arrangement of the sections of the said electrodes respecting one another, should be such that the line joining the centers of gravity of the sections of the elementary electrodes is as short as possible, while leaving to the insulating layer that separates the elementary electrodes from one another a thickness sufficient to prevent molten metal drops from the electrodes from short-circuiting the latter. Under such conditions, the elementary arcs springing from each electrode are concentrated to the maximum degree, and their points of impact on the piece to be welded are spaced from one another at the minimum distance compatible with proper welding. This is particularly necessary when forming a weld at the bottom of the chamfer which is provided when the pieces to be welded offer but little thickness.

Figure 1:
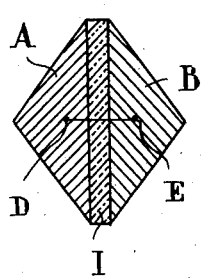
Figure 2:
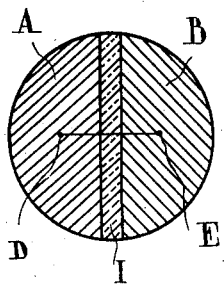
Figure 3:
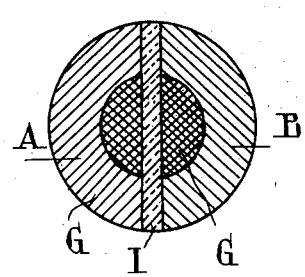
Figure 4:
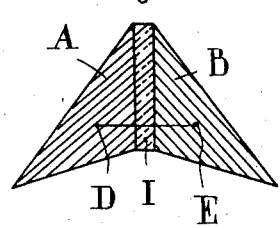
Figure 6:
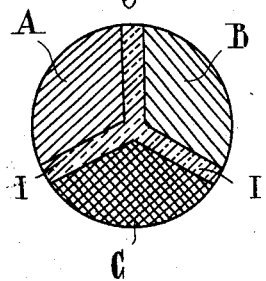
Figure 7:
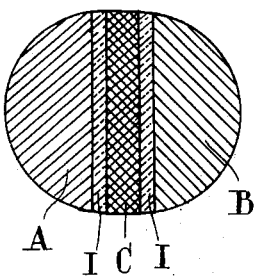
Figure 5:
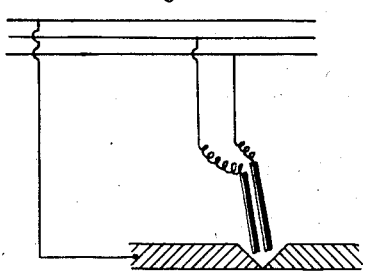
Figure 8:
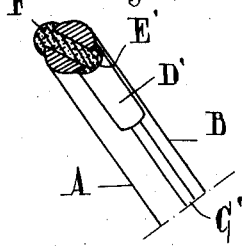
Figure 9:
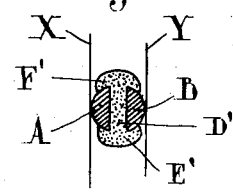

In the drawing appended hereto, Figures 1, 2 and 3 show as examples, cross sections of three types of sticks constructed according to our invention: Fig. 4 is a cross-section of a modification of the form represented in Fig. 1; Fig. 5 is a diagram of an electric circuit connection devised for utilization of the above-described electrodes; Figs. 6 and 7 are cross-sections of two further modifications; and Figs. 8 and 9 are, respectively, a sectional perspective view and a cross-section of still another form.

According to Fig. 1, the weld stick is constituted by two elementary metal bars or electrodes A, B triangular in section. Said elementary electrodes, separated by an insulating material I, are so placed that, in the unit thus obtained, an imaginary line joining the centers of gravity D, E, of members A and B, is shorter than it would be with the two members disposed in any other position relative to each other, for instance, with the arrangement represented in Fig. 4. The two elementary electrodes are bound together by small rings (not shown) made of insulating material, fiber for instance, and slipped on members A and B. Said insulating binding rings must be of such a nature as not to risk causing the arc to be put out. As an example, it may be stated that, with fiber clips, the thickness of the latter should not substantially exceed one millimeter.

In Fig. 2 the section of each elementary electrode A and B is a segment of a circle, and the two segments are so arranged that their flat parts face one another.

The elementary electrodes may have the same or different shapes in cross-section, and the insulating material I should have a thickness which increases according as the cross-sectional area of the electrodes between which it is disposed increases; for instance, it should be about 1 millimeter thick when the total cross-sectional area of the electrodes is about 15 square millimeters, and about 2 millimeters thick for a total cross-sectional area of 60 square millimeters; if the thickness were substantially less than these figures, there would be danger of the drops of molten metal from the electrodes joining before becoming detached, which would short-circuit the two electrodes of the stick.

Furthermore, in certain cases, there is an advantage in the combustion or melting of the insulating material I taking place slightly after the melting of the electrodes, so as to effect the separation of the two arcs. This result is obtained by using silicated pasteboard as the material in question.

To insulate the elementary electrodes from one another we may also use an air gap by putting from place to place on the two elementary electrodes a small fibre member slipped on both electrodes. We can also wind around one of the two electrodes or around each of them an insulated wire maintaining the spacing of the two electrodes, and then fasten them together by this wire or by any other means.

The single stick so constituted may be coated with materials usually employed in electric arc welding; this coating, if sufficiently insulating, may be injected under pressure so as to penetrate the air gap between the two sticks; it then constitutes the insulating material separating them. But such coating or sheath may also be applied initially to each elementary electrode or to the insulator that separates them, while complying with the above stipulated conditions. In this case, especially, we would preferably adopt as the insulating material a substance in the form of sheets, such as pasteboard or cardboard, both sides of which we coat with some adhesive substance, saw gum arabic. We then sprinkle each surface with some coating material, for instance with one or more deoxidizers, such as silico-manganese in the case of iron or steel welding, said deoxidizers being preferably used in sufficient amount to ensure a perfectly sound welding, free from blowholes, and fit to be hammered at about 1000 to 1100° C. without any fracture. Once the whole is dry, we cut strips of the desired width, and we then merely have to place the strip between the two flat parts and to bind the whole as aforedescribed. We may also apply the gum arabic and the coating material on the flat parts of the rods.

These methods of electrode or weld stick manufacture by clamping the flux in the middle thereof between the flat parts can obviously be applied to many other cases.

Moreover, each electrode may have the face which is in contact with the insulating material provided with recesses or hollows to contain the flux.

Figure 3 shows, as an example, such an arrangement, which is especially applicable in the case of cast-iron welding. The electrodes A and B are made of cast-iron and the graphite G is in the inner channels, I always denoting the insulating material.

Once finished, the stick containing in its middle part the insulating material coated with additional material may also be sheathed: indeed, certain sheathing materials may themselves serve as insulating material.

The sticks shown in Figs. 1, 2 and 3 may, for instance, be used according to the diagram illustrated in Fig. 5, either with three-wire, two-phase current or with three-phase current. In both cases two of the distributing mains are connected each with one of the two elementary electrodes, while the third main is connected with the piece to be welded.

Those same sticks may be used with direct or single-phase current so as to subdivide the arcs; all the elementary electrodes are then connected with the same distributing main line.

If an electrode having several cores insulated from one another, as aforesaid, is used, additional metal can be readily grouped with the elementary electrodes, for instance, in the form of a metal rod, so as to form a composite electrode, made up, for instance, as shown in Fig. 6. In this construction, there is applied to the two elementary and identical electrodes A and B, arranged according to our invention, a stick C of the same section and arranged in the same way, this affording the advantage of bringing it as close as can be to the elementary arcs.

In the arrangement shown in Fig. 7, the additional metal stick C is positioned between the two elementary electrodes A and B. It is insulated from each of these by a thin layer of insulating material I, and the parts I, C, I must have the required thickness, as was hereinbefore indicated for the insulating material I, in reference to Figures 1 and 2.

In both these figures the stick or bar C is not traversed by the current.

As will be apparent, the same profile given to the electrode-stick according to our invention lends itself for use in a number of combinations and can be utilized with different currents. Suitable fitment of the electrode-holding clip permits the various desired connections to be obtained with the several elements of the stick.

Regarding the maintenance of such a stick-electrode in the said holder, a special remark has to be made: Due to the heat evolved by the current at the contact of the electrode holder with the electrode, we have found it advantageous to utilize for separating the elementary electrodes in the zone where the electrode is seized by the holder, an insulating material the insulating and refractory capacities of which are higher than in the other zones of the electrode; moreover this insulating material is preferably made in such a shape so as to avoid any wrong handling when it is desired to use it with an electrode-holder.

For instance if the main insulating material of the electrode is pasteboard, we may use instead of pasteboard in the end of the electrode which is to be fastened into the holder, ebonite, fiber or any other insulating refractory material, which may or may not be moulded; moreover this material projects from the metallic cores.

Figs. 8 and 9 show one end of an electrode according to the above indications.

In these figures, the stick-electrode is made of two half electrodes A, B separated by an insulating slip of pasteboard C'. At a certain distance from the end of the stick the insulating slip C' is replaced by an ebonite piece D' of the same thickness as slip C', but provided with two opposite projections E' and F' for maintaining it on the electrodes and, moreover, for preventing the stick, when seizing it by the jaws of the electrode-holder, from being used otherwise than in the position X Y; thus it is impossible to short circuit electrodes A and B through the holder. The jaw X of the holder is of course connected to one phase of the current and the jaw Y to another phase.

We claim as our invention:

1. An electrode which comprises two cores with flat parts arranged to face one another, adhesive material on each of the flat parts, a flux on each adhesive material, and an insulating material between the adhesive materials coated with flux.

2. A stick for arc welding or cutting which comprises two parts having the section of a segment of a circle, laid symmetrically side by side with their flat parts facing one another and separated by an insulating material.

3. A stick for electric arc welding and cutting, which comprises a plurality of metallic cores insulated from one another, each core having a cross-sectional shape other than that of a complete circle; said cores being grouped together in such a way that the line joining the centers of gravity of the sections of the cores is of minimum length for a given thickness of insulating material.

4. A stick for electric arc welding and cutting, comprising two cores each constituted by a bar the section of which is a segment of a circle, and insulating material in sheet form interposed between the two flat faces of the bars; such sheet being coated on both faces with adhesive material and sprinkled with deoxidizing material.

5. A stick for electric arc welding and cutting adapted to be supported by a holder, which stick comprises current-conveying parts laid side by side and separated from one another by an insulating material in the zone where the stick is not gripped by the holder and, in the zone where the stick is gripped by the holder, by a second insulating material, the insulating and refractory capacity of which is higher than that of the first-mentioned insulating material.

6. A stick for electric arc welding and cutting, which comprises two bars laid side by side and having their inner faces separated from each other by insulating material; said material projecting laterally beyond the bars to an extent which is greater in the zone where the stick is gripped by the holder than in the zone where it is not gripped by the holder; said bars being partly bare on the portions of their outer faces which are directly opposite the insulating material between their said inner faces.

In testimony whereof we affix our signatures.

MAURICE LEBRUN.
JEAN BRILLIÉ.